(12) United States Patent
Doerner (10) Patent No.: US 8,886,613 B2
(45) Date of Patent: Nov. 11, 2014

(54) PRIORITIZING DATA DEDUPLICATION

(76) Inventor: Don Doerner, San Jose, CA (US)

(*) Notice: Subject to any disclaimer, the term of this patent is extended or adjusted under 35 U.S.C. 154(b) by 56 days.

(21) Appl. No.: 12/902,272

(22) Filed: Oct. 12, 2010

(65) Prior Publication Data

US 2012/0089574 A1    Apr. 12, 2012

(51) Int. Cl.
*G06F 7/00*     (2006.01)
*G06F 17/00*    (2006.01)
*G06F 17/30*    (2006.01)

(52) U.S. Cl.
CPC .................. *G06F 17/3015* (2013.01)
USPC ........................................................ 707/692

(58) Field of Classification Search
USPC ................................................ 707/692, 693
See application file for complete search history.

(56) References Cited

U.S. PATENT DOCUMENTS

| | | | |
|---|---|---|---|
| 2010/0325093 A1* | 12/2010 | Bates et al. | 707/692 |
| 2010/0332456 A1* | 12/2010 | Prahlad et al. | 707/664 |
| 2011/0066595 A1* | 3/2011 | Kreuder et al. | 707/634 |
| 2011/0246429 A1* | 10/2011 | Prahlad et al. | 707/679 |

* cited by examiner

*Primary Examiner* — Hosain Alam
*Assistant Examiner* — Van Oberly (57) ABSTRACT

An example method includes controlling a data de-duplication apparatus to arrange a de-duplication schedule based on the presence or absence of a replication indicator in an item to be de-duplicated. The method also includes selectively controlling the de-duplication schedule based on a replication priority. In one embodiment, the method includes, upon determining that a chunk of data is associated with a replication indicator, controlling the data de-duplication apparatus to schedule the chunk for de-duplication ahead of chunks not associated with a replication indicator. In one embodiment, the method also includes, upon determining that the chunk is associated with a replication priority, controlling the data de-duplication apparatus to schedule the chunk for de-duplication ahead of chunks of data not associated with a replication priority. The schedule location is based, at least in part, on the replication priority. The method also includes controlling de-duplication order based on the schedule.

17 Claims, 7 Drawing Sheets

PRIORITIZING DATA DEDUPLICATION

BACKGROUND

Conventionally, all data to be de-duplicated may have been treated the same. To the extent that there has been any scheduling associated with de-duplication, that scheduling may have been simple first-in first-out (FIFO) scheduling where the first item identified for de-duplication is the first item de-duplicated. However, not all data to be de-duplicated may be equal. For example, an organization (e.g., enterprise, business, university) may have two types of data: mission critical data that is to be replicated and mission-useful data that may not be replicated. These two types of data may be distributed in various locations in an organization and stored on different storage devices (e.g., tapes, disk drives) residing at various levels of different networks.

The organization may consider their business to be secure if and when their mission critical data is replicated. Therefore, to enhance business security, the organization may desire to have their mission critical data replicated as soon as possible, or at least before the mission useful data. But this desire may be frustrated because a data replicating application or apparatus may first require that data be de-duplicated before it can be replicated. Yet conventional de-duplication has no way to distinguish one type of data from another type of data and therefore no way to prioritize for de-duplication one type of data (e.g., data to be replicated) over another type of data (e.g., data that will not be replicated).

The foregoing statements are not intended to constitute an admission that any patent, publication or other information referred to herein is prior art with respect to this disclosure. Rather, these statements serve to present a general discussion of technology and associated issues in the technology.

BRIEF DESCRIPTION OF THE DRAWINGS

The accompanying drawings, which are incorporated in and constitute a part of the specification, illustrate various example systems, methods, and other example embodiments of various aspects of the invention. The illustrated element boundaries (e.g., boxes, groups of boxes, or other shapes) in the figures represent one example of the boundaries. In some examples one element can be designed as multiple elements or multiple elements can be designed as one element. In some examples, an element shown as an internal component of another element can be implemented as an external component and vice versa. Furthermore, elements may not be drawn to scale.

DETAILED DESCRIPTION

Example methods and apparatuses concern prioritizing data de-duplication. Prioritizing data de-duplication can be facilitated by being able to distinguish one set of data from another set of data with respect to de-duplication scheduling priority. Example methods and apparatuses also concern, either directly or indirectly, prioritizing data replication. Prioritizing replication can also be facilitated by being able to distinguish one set of data from another set of data with respect to replication priority. Before replicating a piece of ingested data, it may be desired to have first deduplicated all the chunks associated with the piece of ingested data. Therefore, prioritizing replication may involve allocating resources so that once one chunk of ingested data has been started, the deduplicating will proceed in a manner that advances the time at which all the related chunks will be deduplicated thus making the ingested data available for replication.

In one embodiment, de-duplication scheduling priority may be an explicitly coded priority. For example, a priority value can be added to the set of data and/or in metadata associated with the set of data. In another embodiment, de-duplication scheduling priority may be derived from an implicit property of the data set. For example, data that is identified as being targeted for replication may be scheduled for de-duplication before data that is not targeted for replication. In yet another embodiment, de-duplication scheduling priority may be a combination of an implicit property and an explicitly coded priority. By way of illustration, an implicit property (e.g., replication status) may first identify that the item is to be prioritized and then an explicit priority (e.g., priority value) may further refine the order in which prioritized items are to be de-duplicated. In one embodiment, where there are separate de-duplication schedules and replication schedules, both replication and/or de-duplication scheduling priority can control gross and/or fine position in the de-duplication schedule while replication priority can control fine position in the replication schedule.

While replication is identified as one implicit property, one skilled in the art will appreciate that in other embodiments, other properties (e.g., freshness, location, security level) may also be considered as implicit properties upon which high level prioritization may be based.

In different examples, an organization may identify items to be replicated at different levels of granularity. For example, an organization may identify virtual tape cartridges, specific files, or other items to be replicated. When these items are ingested for de-duplication, they may first be identified as having an implicit priority based on their replication status. This may advance the item in the de-duplication schedule. Then, the explicit priority may again revise their location in the de-duplication schedule.

In one conventional system, as data is ingested, it is split into large, fixed-size chunks. The fixed-size chunks may be stored as a file that may be referred to as a chunk file. One conventional system maintains a queue of chunk files to be de-duplicated and replicated. As virtual tape cartridges, NAS files, and other entities are written, chunk files are created, written and closed. Conventionally, when closed, the chunk files are placed at the end of a FIFO queue for de-duplication and then subsequently for replication. Chunk files are de-duplicated independently. These activities are prosecuted in queue order, ignorant of replication requirement and/or replication priority. Example apparatuses and methods facilitate re-ordering chunks in the FIFO queue, or other de-duplication schedule based, at least in part, on the de-duplication priority derived from implicit and/or explicit values. In example apparatuses and methods, a chunk inherits the requirement for replication and the replication priority, if any that is associated with the larger data set from which it was chunked.

Example apparatuses and methods alter the order for de-duplicating data. For example, chunks to be replicated will be de-duplicated first, before chunks not to be replicated. Additionally, if finer grained replication priority is available, chunks will be de-duplicated in order based on that finer grained priority. Otherwise, in one embodiment, chunks to be replicated will be processed in FIFO order. Then, remaining data (e.g., chunks not to be replicated) will be de-duplicated in FIFO order.

In one embodiment, the scheduling involves explicitly prioritizing the queue of chunks and inserting newly arrived chunks into the queue in replication priority order.

Consider the following illustrative example:
a. Assume that a user writes 10 virtual tape cartridges, each of approximately 800 GB: VOLAAA, VOLAAB, VOLAAC, VOLAAD, VOLAAE, VOLAAF, VOLAAG, VOLAAH, VOLAAI and VOLAAJ.
b. VOLAAA, VOLAAB, VOLAAC, VOLAAD, VOLAAE and VOLAAF are written first, after which VOLAAG, VOLAAH, VOLAAI and VOLAAJ are written.
c. Of these, two virtual tape cartridges are critical business data, intended for replication: VOLAAI and VOLAAJ. They are assigned replication priority 2 (replication priorities run from 1=high to 65535=low).
d. After creating these virtual tape cartridges, the user writes a single file of 100 MB in an NAS share; this file contains processing instructions for the target system related to VOLAAI and VOLAAJ. This file is also intended for replication and, because without this file, no use can be made of VOLAAI and VOLAAJ at the target site, is assigned replication priority 1.

This will result in a set of files in the de-duplication queue:
a. From VOLAAA through VOLAAF we will have approximately 20,000 files to be de-duplicated: call them VOLAAA.0001 to VOLAAA.3200, VOLAAB.0001 to VOLAAB.3200 and so forth to VOLAAF.3200. None of these files is to be replicated.
b. Behind these files in the de-duplication queue will be another 13,000 files for virtual tape cartridges VOLAAG through VOLAAJ. Approximately half of these files are to be replicated at priority 2.
c. Finally, there will be a single file, which in one example may include a single chunk, representing the target-side processing instructions, to be replicated at priority 1.

Without reprioritization, the last data de-duplicated, and therefore the last data to be replicated, will be the target-side processing instructions in the NAS file. Yet the replicated data from VOLAAI and VOLAAJ is substantially worthless without the target-side processing instructions. Clearly this is a sub-optimal ordering. Additionally, most of the data from VOLAAA through VOLAAF will be de-duplicated before the first file that is to be replicated is de-duplicated. Again, this is a sub-optimal ordering.

Analyzing the example shows that if, on average, de-duplication can process one file per second, and replication can keep up with de-duplication, then replication will complete approximately 9 hours after ingest starts, which is approximately 7 hours after it ends. No data to be replicated will be replicated until ingest is complete and until de-duplication is complete. This creates an unnecessarily long period of time during which the mission critical data has been sent for replication but has not been replicated. But if reprioritization as described herein is implemented, and assuming that ingest outpaces data de-duplication by a factor of 4, then replication could complete as early as 3.5 hours after ingest starts, which is approximately 1.5 hours after ingest ends. This significantly shortens the period during which the organization is exposed without replicated mission critical data.

Figure 1:
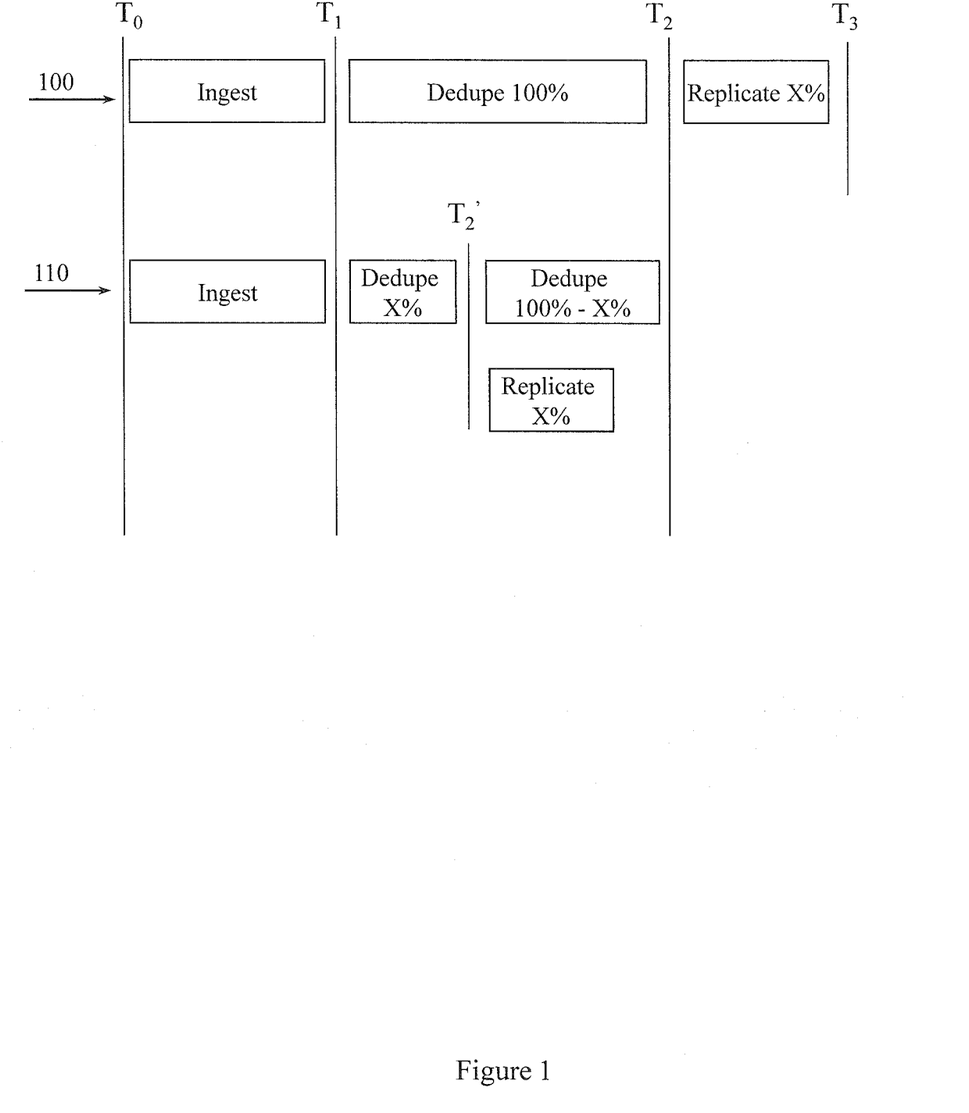
FIG. 1 compares de-duplication and replication timelines for different de-duplication approaches.

FIG. 1 illustrates a conventional approach 100 including ingest, complete de-duplication in FIFO order, and then selective replication. FIG. 1 also illustrates an enhanced approach 110 including ingest, de-duplicating data to be replicated first, and then de-duplicating data not to be replicated in parallel with replicating data to be replicated. In both cases the ingest takes the same amount of time (e.g., $T_0$ to $T_1$). In both cases de-duplicating the data to be replicated takes the same amount of time (e.g., $T_1$ to $T_2'$) and de-duplicating the data not to be replicated takes the same amount of time (e.g., $T_2'$ to $T_2$). Thus, the total time to de-duplicate is the same (e.g., $T_1$ to $T_2$). However, in the enhanced approach 100, because the data to be replicated is de-duplicated first, replication can begin at $T_2'$ while de-duplication of the data not to be replicated continues in parallel with the replication. This yields at least two improvements: that data is replicated earlier, and that overall processing time is reduced from $T_3$ to $T_2$. In one example, all of the data to be replicated will be deduplicated before any of the data that is not to be replicated will be deduplicated. In this example, deduplication of multiple pieces of ingested will not be interleaved. Instead, resources will be allocated to deduplicate related pieces of data together.

Ingest takes a period of time from $T_0$ to $T_1$ that is equal in both examples. Conventional de-duplication 100 is priority-ignorant and thus replication cannot be guaranteed to begin until 100% of the data has been de-duplicated at $T_2$. However, de-duplication 110 as enhanced by example apparatuses and methods can complete de-duplication of data to be replicated at $T_2'$, and can immediately begin replicating that de-duplicated data at $T_2'$. Meanwhile, de-duplication of the data not to be replicated can continue in parallel, with the entire process ending at $T_2$. In the conventional approach 100, processing would continue until $T_3$ because no replication can begin until all de-duplication is completed. Therefore, the example apparatuses and methods provide at least two improvements over conventional systems. First, replication can begin before 100% of the data to be de-duplicated has been de-duplicated. This means that replication can also end earlier. Second, overall processing time can be reduced because at least some replication and de-duplication can proceed in parallel.

Figure 2:
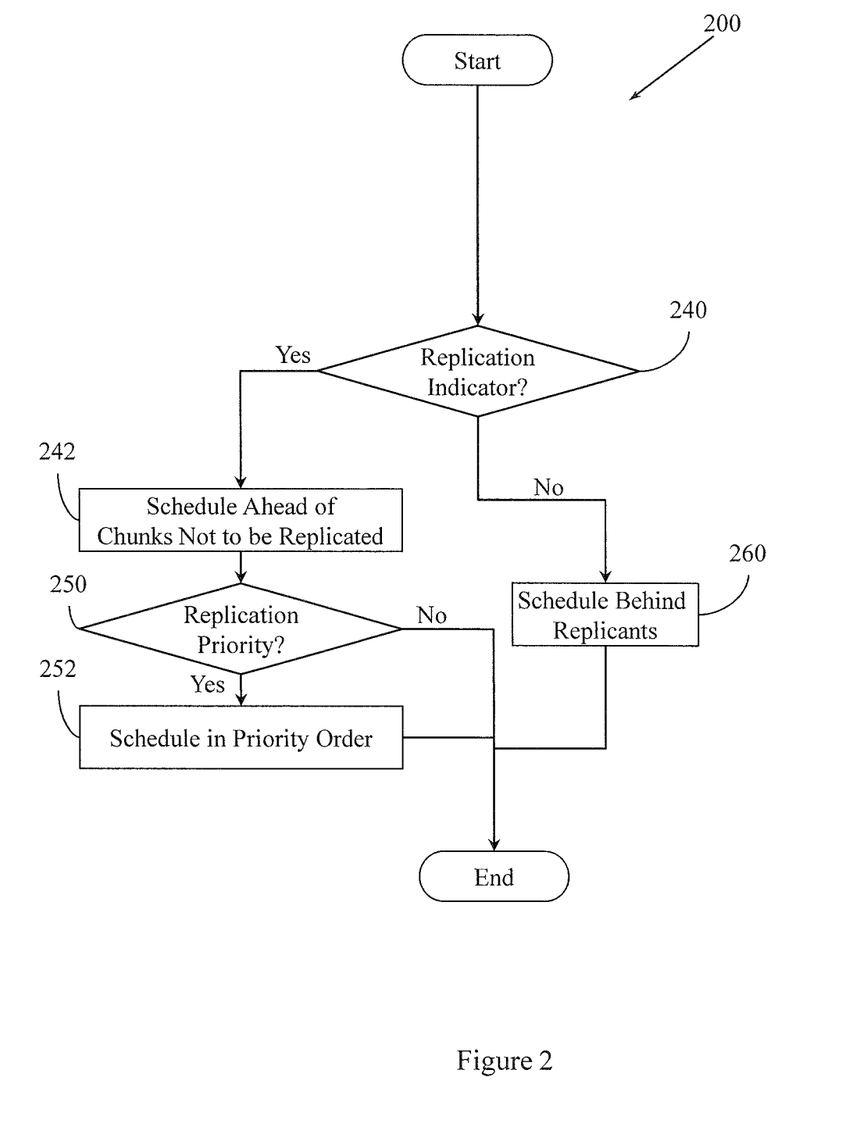
FIG. 2 illustrates a method associated with prioritizing data de-duplication.

FIG. 2 illustrates a method 200. Method 200 controls a data de-duplication apparatus. At 240, a determination is made concerning whether data to be de-duplicated is associated with a replication indicator. Upon determining that a chunk of data to be de-duplicated by the data de-duplication apparatus is associated with a replication indicator, method 200 proceeds, at 242, to control the data de-duplication apparatus to schedule the chunk of data for de-duplication ahead of chunks of data not associated with a replication indicator. The scheduling may involve, for example, placing the data or information for locating the data in a de-duplication schedule location. The schedule location is based, at least in part, on the replication indicator. In one example, the schedule may be stored in a data structure (e.g., queue, linked list).

If the determination at 240 is No, that the data is not associated with a replication indicator, then processing proceeds to 260, where the data de-duplication apparatus is controlled to schedule the chunk of data for de-duplication behind chunks of data having associated replication indicators. In one example, this may involve placing the chunk of data or information for locating the chunk of data in a de-duplication schedule location that will cause the chunk of data to be de-duplicated after data that is going to be replicated.

Method 200 also includes, at 250, determining whether a chunk of data to be de-duplicated and replicated has a replication priority associated with it. Upon determining that the chunk of data to be de-duplicated by the data de-duplication apparatus is associated with a replication priority, method 200 proceeds, at 252, to control the data de-duplication apparatus to schedule the chunk of data for de-duplication in a de-duplication schedule location ahead of chunks of data not associated with a replication priority. The schedule location is based, at least in part, on the replication priority. For example, a first (e.g., higher) priority may indicate that a chunk of data should be de-duplicated before a chunk of data having a second (e.g., lower) priority.

Figure 3:
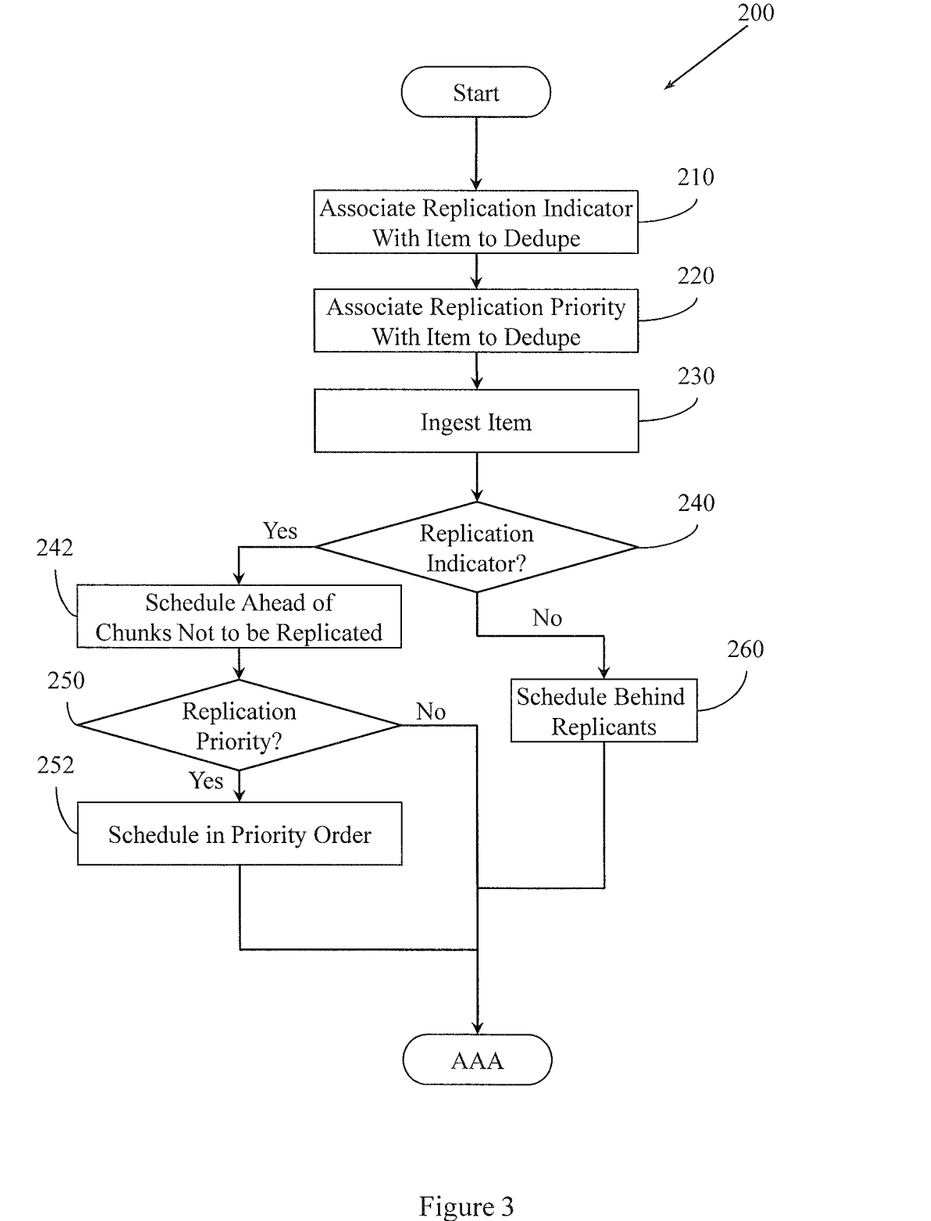
FIG. 3 illustrates a method associated with prioritizing data de-duplication and replication.
Figure 4:
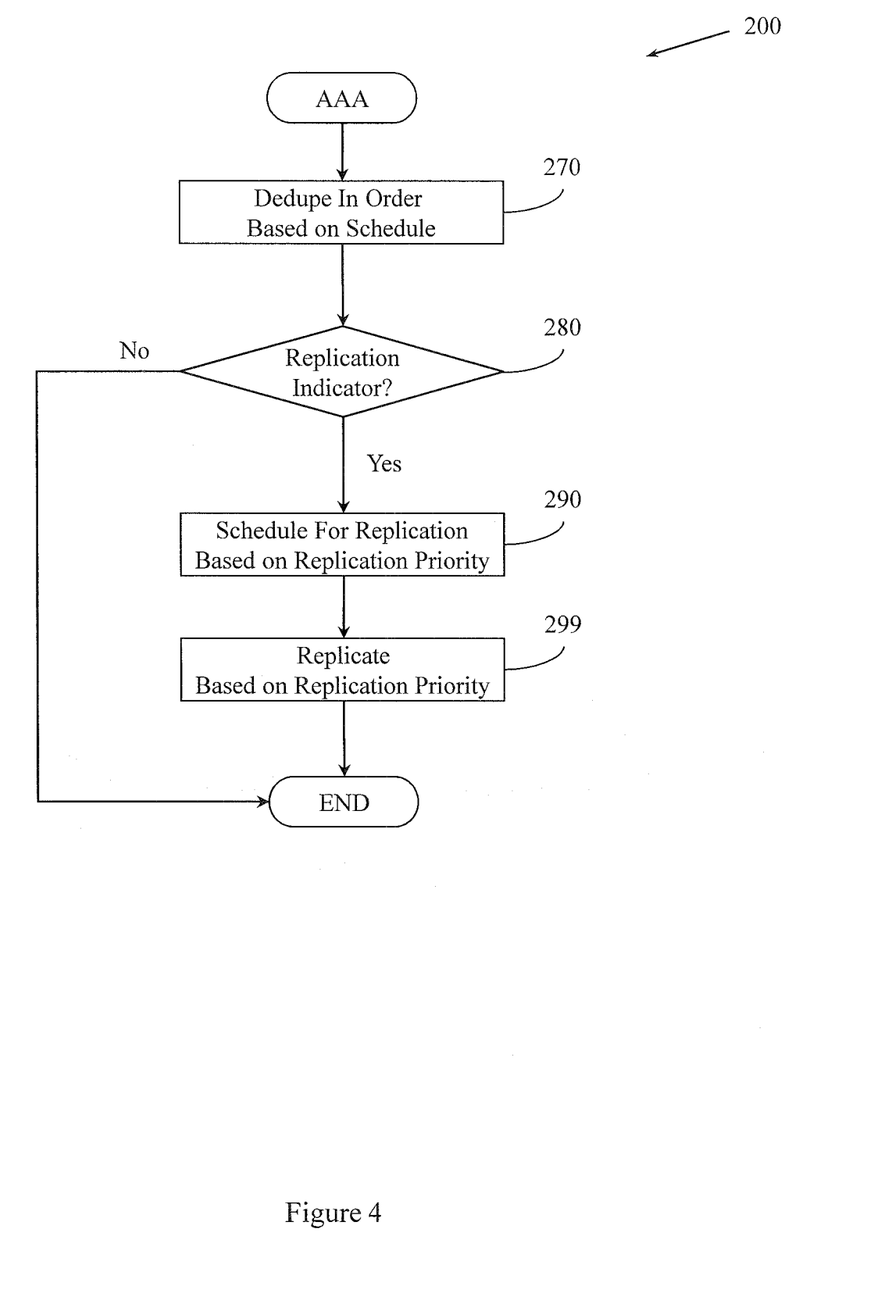
FIG. 4 illustrates a method associated with prioritizing data de-duplication and replication.

While FIG. 2 illustrates scheduling, FIGS. 3 and 4 illustrate other embodiments of method 200 where replication indicators and/or replication priorities are associated with data, and where de-duplication and replication occur.

FIG. 3 illustrates another embodiment of method 200. In addition to the actions described in FIG. 2, this embodiment also includes, at 210, controlling the data de-duplication apparatus to selectively associate replication indicators with items to be de-duplicated that are to be replicated. Associating replication indicators with items to be de-duplicated may include, for example, adding a replication indicator to an item, and adding a replication indicator to metadata associated with an item. One skilled in the art will appreciate that there are other ways to associate a replication indicator with an item.

This embodiment of method 200 also includes, at 220, controlling the data de-duplication apparatus to selectively associate replication priorities with items to be replicated. A replication priority describes a relative order in which an item is to be replicated. Associating the replication priorities with items to be de-duplicated can include, for example, adding a replication priority to an item, and adding a replication priority to metadata associated with an item. One skilled in the art will appreciate that there are other ways to associate a replication priority with an item. In different embodiments the item may be, for example, a virtual tape cartridge, and a file.

This embodiment of method 200 also includes, at 230, controlling the data de-duplication apparatus to ingest the item to be de-duplicated. Ingesting the item may include sub-dividing the item into one or more chunks of data to be de-duplicated. The chunks may be fixed sized, variably sized, and may be chunked using different techniques. In one example, the chunk of data to be de-duplicated may be stored as a "chunk file." One skilled in the art will appreciate that there are different ways to store chunked data. During ingest, status associated with a replication indicator or with a replication priority is maintained. Therefore, a chunk of data may be associated with the same replication indicator and the same replication priority as the item from which it was chunked.

FIG. 3 leaves off at AAA, and FIG. 4 picks up at AAA.

FIG. 4 illustrates how method 200 proceeds, at 270, by controlling the data de-duplication apparatus to produce a de-duplicated chunk of data from a chunk of data to be de-duplicated. The de-duplicated chunk of data is selected in order according to the de-duplication schedule. Thus, chunks that are not to be replicated will be de-duplicated after chunks that are to be replicated. When a replication priority as well as a replication indicator were associated with an item, the chunks to be replicated may be further ordered based, for example, on the replication priority.

Since some de-duplicated chunks of data may be replicated, which is indicated by a replication indicator, this embodiment of method 200 includes, at 280, determining whether a chunk of data is associated with a replication indicator. Recall that a chunk will retain an association with a replication indicator and replication priority established between the parent of the chunk (e.g., the item) and the indicator or priority. Upon determining at 280 that a de-duplicated chunk of data is to be replicated, method 200 continues by providing the de-duplicated chunk of data to a data replication apparatus.

In one example, if the chunk of data is associated with both a replication indicator and a replication priority, then finer grained control may be exercised over replication order. Therefore, at 290, upon determining that the de-duplicated chunk of data to be replicated by the data replication apparatus is associated with a replication priority, method 200 may control the data replication apparatus to schedule the chunk of de-duplicated data for replication in a replication schedule location determined by the replication priority. Once the replication schedule is complete, method 200 may proceed, at 299, to control the data replication apparatus to produce a replicated chunk of data from a de-duplicated chunk of data. The de-duplicated chunk of data will be selected in order according to the replication schedule.

Figure 5:
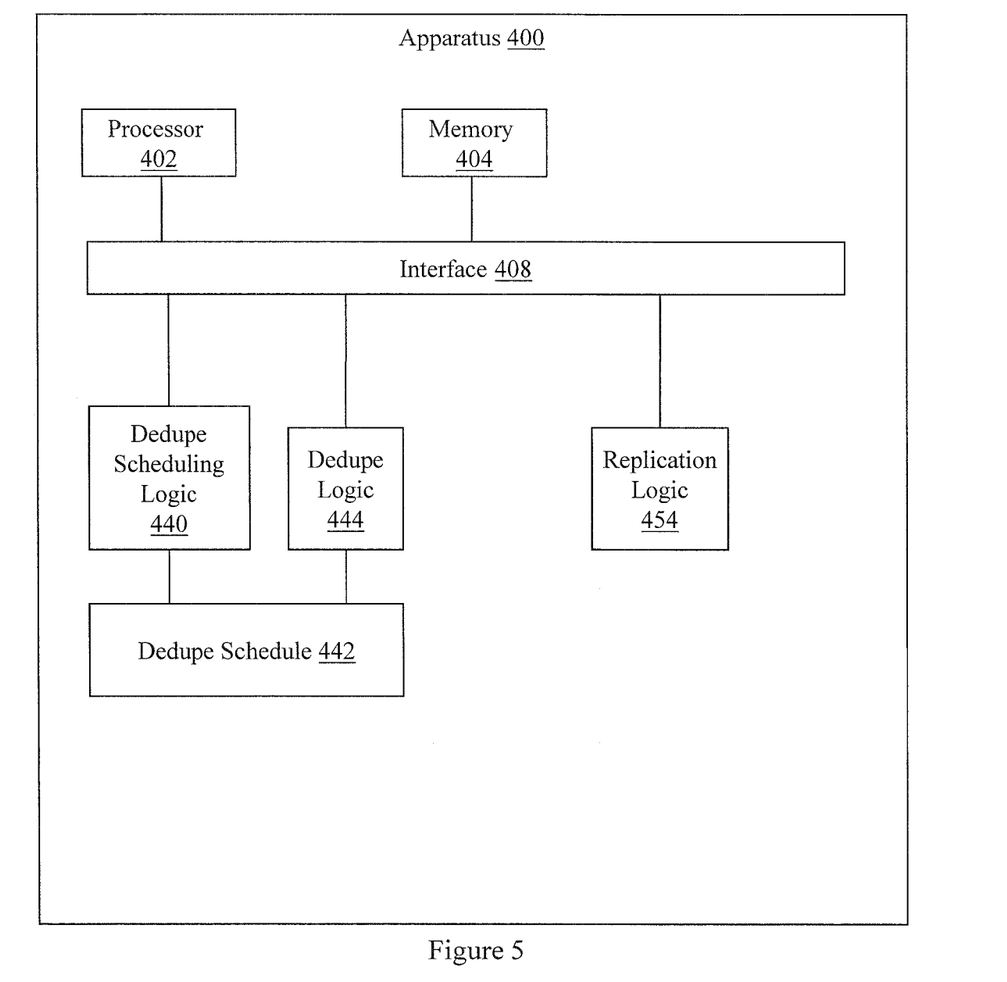
FIG. 5 illustrates an apparatus associated with prioritizing data de-duplication.

FIG. 5 illustrates an apparatus 400. Apparatus 400 includes a processor 402, a memory 404, and an interface 408 connecting the processor 402, the memory 404, and a set of logics.

In one embodiment, the set of logics includes a de-duplication scheduling logic 440, a de-duplication logic 444, and a replication logic 454. The de-duplication scheduling logic 440 is configured to manage a de-duplication schedule 442. The de-duplication schedule 442 stores chunks of data for de-duplication or information about chunks of data for de-duplication. The order in which items are placed in the schedule 442 is a function of a de-duplication priority associated with a chunk. In one example, the de-duplication priority may be assigned to control just de-duplication order. In another example, the de-duplication priority may actually be assigned to control replication order by controlling de-duplication order.

Apparatus 400 includes a de-duplication logic 444 that is configured to de-duplicate chunks of data in order based on the de-duplication schedule 442. Since chunks of data are scheduled based on de-duplication priority, apparatus 400 does not necessarily behave like a conventional system that processes chunks in the order they were received.

In one example, apparatus 400 includes a replication logic 454 that is configured to replicate a de-duplicated chunk of data produced by the de-duplication logic 444. In one example, the replication logic 454 will simply replicate chunks in the order they are received from the de-duplication logic 444, where the order was determined on a first in first out basis at the de-duplication logic 444. In another example, the order may be more finely controlled. For example, the de-duplication scheduling logic 440 may manage the de-duplication schedule 442 based, at least in part, on a replication priority associated with a chunk. In another embodiment, de-duplication scheduling and replication scheduling may be handled by separate components.

Figure 6:
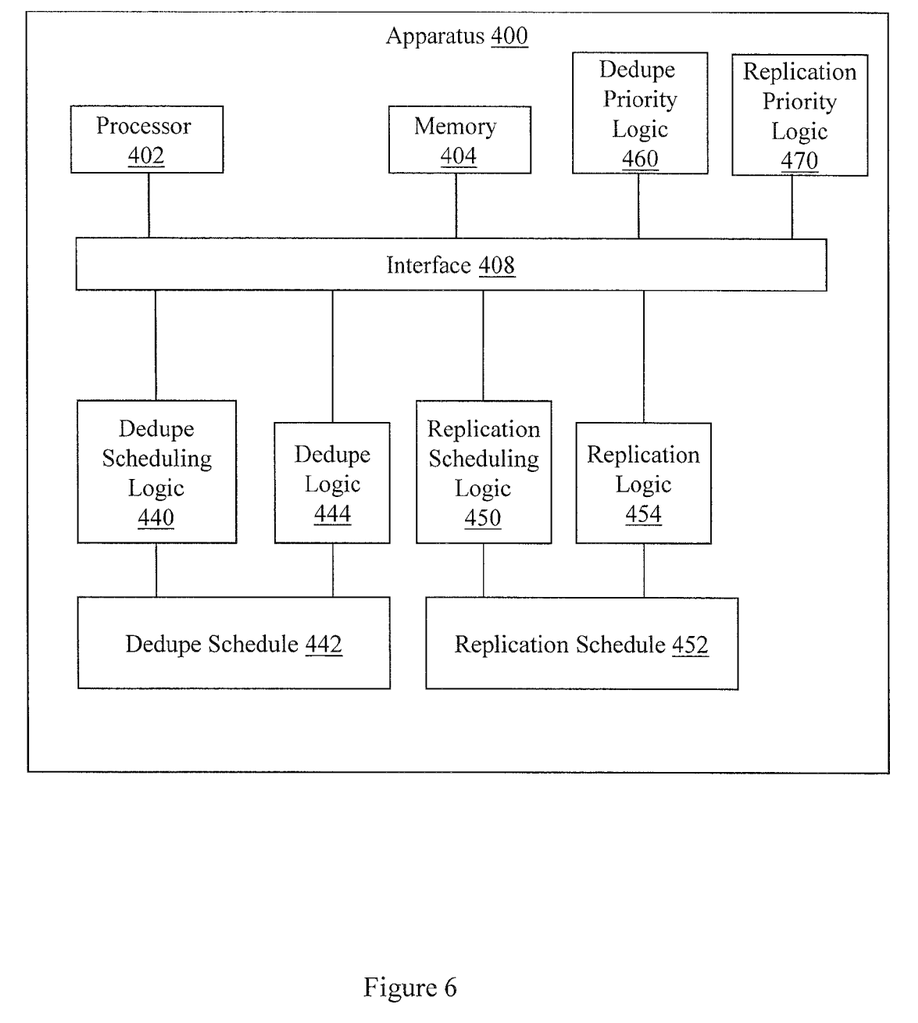
FIG. 6 illustrates an apparatus associated with prioritizing data de-duplication and replication.

FIG. 6 illustrates another embodiment of apparatus 400. In addition to all the elements in the embodiment in FIG. 5, this embodiment includes a de-duplication priority logic 460, a replication priority logic 470, and a replication scheduling logic 450. In one example, the replication scheduling logic 450 is configured to manage a replication schedule 452 of de-duplicated chunks of data to be replicated. The replication schedule 452 is a different schedule than the de-duplication schedule 442. Placement in the replication schedule 452 may be a function of a replication priority associated with a de-duplicated chunk.

In one embodiment, the de-duplication priority logic 460 is configured to establish a de-duplication priority for an item. The item may be, for example, a virtual tape cartridge, a file, or other item. In one example, the de-duplication priority is established based on whether the item is to be replicated. For example, items to be replicated can be given a higher de-duplication priority than items that are not to be replicated. While replication is described, one skilled in the art will appreciate that there may be other reasons why it may be desired to de-duplicate one item before another. Thus, in one example, de-duplication priority logic 460 is not constrained to assign priority based only on whether a chunk of data will be replicated.

In one embodiment, apparatus 400 can also include the replication priority logic 470. The replication priority logic 470 can be configured to establish a replication priority for an item (e.g., virtual tape cartridge, file). The replication priority can be used by the replication scheduling logic 450 to provide finer grained control over the replication schedule 452. In one embodiment, the replication priority may also be used by the de-duplication scheduling logic 440 to provide finer grained control over the de-duplication schedule 442.

Figure 7:
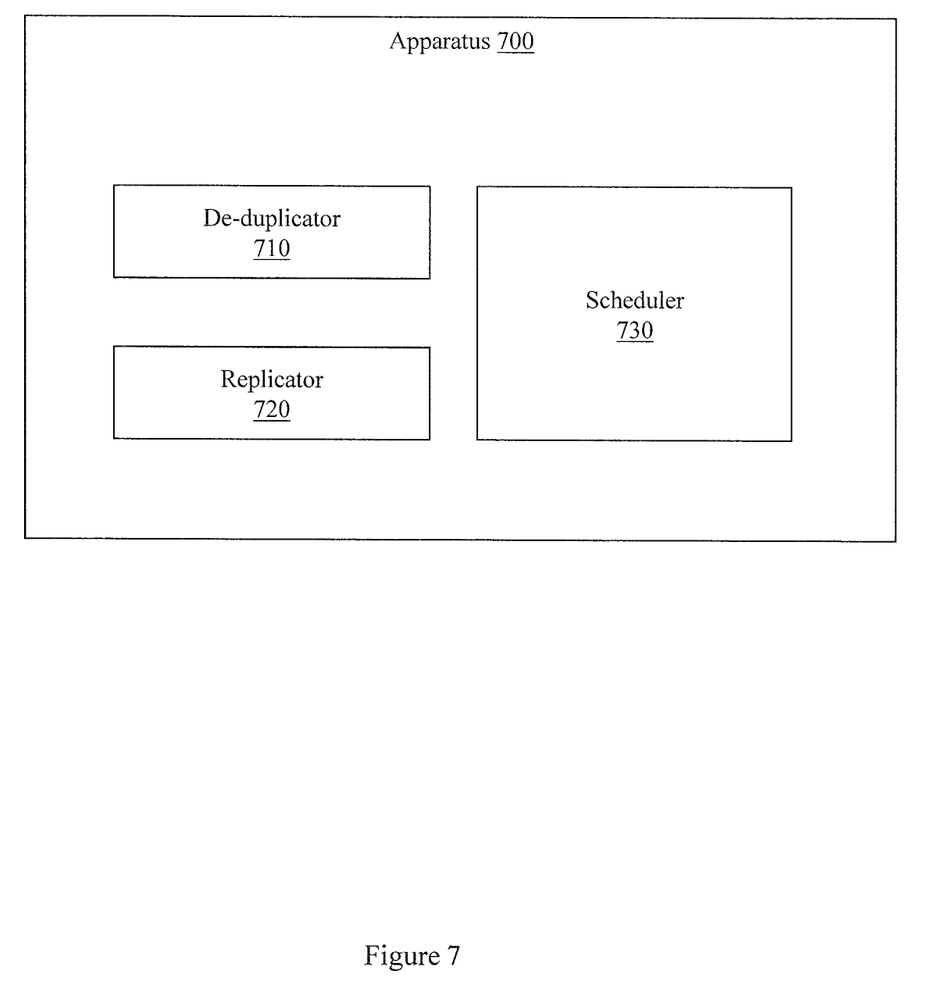
FIG. 7 illustrates an apparatus associated with prioritizing data de-duplication and replication.

FIG. 7 illustrates an apparatus 700. Apparatus 700 includes a de-duplicator 710, a replicator 720, and a scheduler 730. The de-duplicator 710 is configured to de-duplicate data. Conventionally data would be de-duplicated in the order in which it was received. Apparatus 700 does not need to de-duplicate data in the order in which it was received. The replicator 720 is configured to replicate de-duplicated data produced by the de-duplicator 710. The replicator 720 will replicate data in the order it is received from the de-duplicator 710. The scheduler 730 is configured to control the order in which data is replicated by the replicator 720 by controlling the order in which data is de-duplicated by the de-duplicator 710. In one example, the scheduler 730 examines data received by apparatus 700 to determine whether the data is to be replicated. If the data is to be replicated, then the scheduler 730 causes that data to be de-duplicated before data that is not going to be replicated. By controlling the order in which data is de-duplicated, the scheduler 730 therefore controls the order in which data is replicated.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B), the term "or" is intended to mean "A or B or both". The phrase "only A or B but not both" indicates that "only A or B but not both" is to be employed. Thus, use of the term "or" herein is the inclusive, and not the exclusive use. See, Bryan A. Garner, A Dictionary of Modern Legal Usage 624 (2d. Ed. 1995).

What is claimed is:

1. A method for controlling a data de-duplication apparatus, comprising:

upon determining that a chunk of data to be de-duplicated by the data de-duplication apparatus is associated with a replication indicator located in the chunk of data, controlling the data de-duplication apparatus to schedule the chunk of data for de-duplication in a de-duplication schedule location ahead of chunks of data not associated with a replication indicator, where the schedule location is based, at least in part, on the replication indicator; and upon determining that the chunk of data to be de-duplicated is not associated with a replication indicator located in the chunk of data, controlling the data de-duplication apparatus to schedule the chunk of data for de-duplication in a de-duplication schedule location behind chunks of data having associated replication indicators, where the chunk of data is a portion of a piece of ingested data, where the replication indicator controls whether the chunk of data is to be replicated, and where the replication indicator controls the order in which chunks are deduplicated so that chunks that are going to be replicated are deduplicated before chunks that are not going to be replicated.

2. The method of claim 1, comprising:

upon determining that the chunk of data to be de-duplicated by the data de-duplication apparatus is associated with a replication priority, controlling the data de-duplication apparatus to schedule the chunk of data for de-duplication in a de-duplication schedule location ahead of chunks of data not associated with a replication priority, where the schedule location is based, at least in part, on the replication priority, where the replication priority describes a relative order in which an item is to be replicated;

and upon determining that the chunk of data to be de-duplicated is not associated with a replication priority, controlling the data de-duplication apparatus to schedule the chunk of data for de-duplication in a de-duplication schedule location behind chunks of data having associated replication priorities, where the replication priority is located in the chunk of data or is located in metadata associated with the chunk of data.

3. The method of claim 2, comprising:

controlling the data de-duplication apparatus to selectively associate replication indicators with items to be de-duplicated that are also to be replicated, where associating replication indicators with items to be de-duplicated includes adding a replication indicator to an item.

4. The method of claim 2, comprising:
controlling the data de-duplication apparatus to selectively associate replication priorities with items to be replicated.

5. The method of claim 4, where associating the replication priorities with items to be de-duplicated includes one or more of, adding a replication priority to an item, and adding a replication priority to metadata associated with an item.

6. The method of claim 5, the item being one of, a virtual tape cartridge, and a file.

7. The method of claim 2, comprising:
controlling the data de-duplication apparatus to ingest the item to be de-duplicated, where ingesting the item comprises sub-dividing the item into one or more chunks of data to be de-duplicated, and where status associated with a replication indicator associated with the item is maintained by the one or more chunks of data.

8. The method of claim 7, where status associated with a replication priority associated with the item is maintained by the one or more chunks of data.

9. The method of claim 1, comprising:
controlling the data de-duplication apparatus to produce a de-duplicated chunk of data from a chunk of data to be de-duplicated, where the de-duplicated chunk of data is selected in order according to the de-duplication schedule.

10. The method of claim 9, comprising:
upon determining that a de-duplicated chunk of data is to be replicated, providing the de-duplicated chunk of data to a data replication apparatus.

11. The method of claim 10, comprising:
upon determining that the de-duplicated chunk of data to be replicated by the data replication apparatus is associated with a replication priority, controlling the data replication apparatus to schedule the chunk of de-duplicated data for replication in a replication schedule location determined by the replication priority, where the replication priority describes a relative order in which an item is to be replicated.

12. The method of claim 11, comprising:
controlling the data replication apparatus to produce a replicated chunk of data from a de-duplicated chunk of data, where the de-duplicated chunk of data is selected in order according to the replication schedule.

13. An apparatus for prioritizing chunks that are going to be replicated ahead of chunks that are not going to be replicated, comprising:
a processor;
a memory; and
an interface connecting the processor, the memory, and a set of logics, the set of logics comprising:
a de-duplication scheduling logic that manages a de-duplication schedule of chunks of data for de-duplication, where the de-duplication schedule is based, at least in part, on a de-duplication priority associated with a chunk; and
a de-duplication logic that de-duplicates chunks of data in an order determined by the de-duplication schedule, where the de-duplication scheduling logic manages the de-duplication schedule based, at least in part, on a replication indicator located in the chunk and a replication priority associated with the chunk, and
a replication logic that replicates a de-duplicated chunk of data produced by the de-duplication logic,
where the chunks of data are portions of a piece of ingested data, the portions being less than an entire file,
where the replication indicator controls whether an individual chunk of data is to be replicated,
where the replication indicator controls whether an individual chunk is to be replicated,
where the replication indicator is located in the chunk of data, and
where the replication indicator controls the order in which chunks are deduplicated so that chunks that are going to be replicated are deduplicated before chunks that are not going to be replicated.

14. The apparatus of claim 13, the set of logics comprising:
a replication scheduling logic configured to manage a replication schedule of de-duplicated chunks of data to be replicated, where the replication schedule is based, at least in part, on a replication priority associated with a de-duplicated chunk, where the replication priority is located in the de-duplicated chunk of data or is located in metadata associated with the de-duplicated chunk of data, and where the replication priority describes a relative order in which an item is to be replicated.

15. The apparatus of claim 13, the set of logics comprising:
a de-duplication priority logic configured to establish a de-duplication priority for an item, the item being one of, a virtual tape cartridge, and a file.

16. The apparatus of claim 15, where the de-duplication priority is established based on whether the item is to be replicated.

17. The apparatus of claim 13, the set of logics comprising:
a replication priority logic configured to establish a replication priority for an item, the item being one of, a virtual tape cartridge, and a file, where the replication priority describes a relative order in which an item is to be replicated.

* * * * *